May 31, 1955     I. M. LE BARON     2,709,640
VERTICAL DEN FOR CONTINUOUS SUPERPHOSPHATE SOLIDIFICATION
Filed April 20, 1950
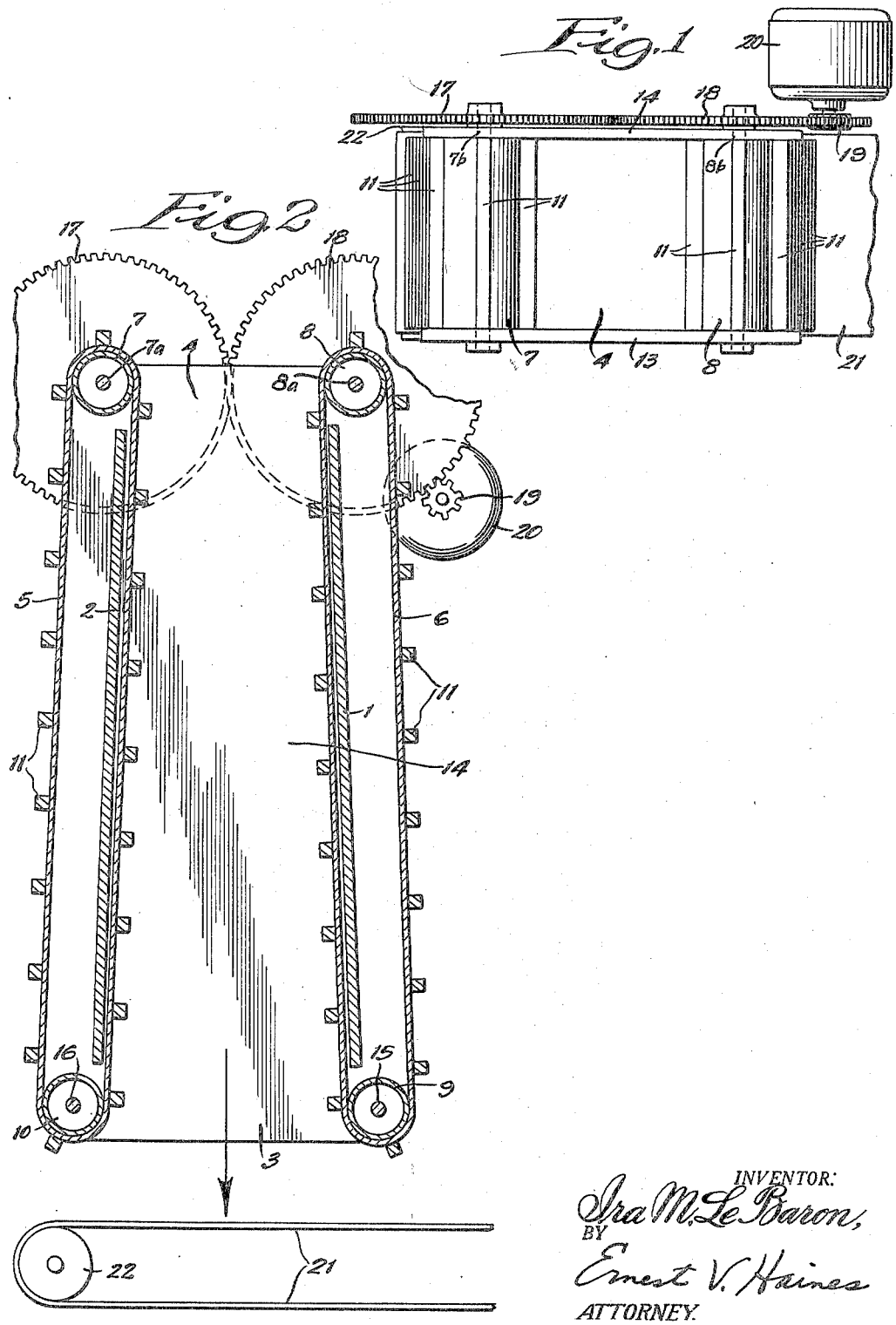
INVENTOR:
Ira M. Le Baron,
BY
Ernest V. Haines
ATTORNEY.

United States Patent Office 2,709,640
Patented May 31, 1955

2,709,640

VERTICAL DEN FOR CONTINUOUS SUPER-PHOSPHATE SOLIDIFICATION

Ira M. Le Baron, Lakeland, Fla., assignor to International Minerals & Chemical Corporation, a corporation of New York Application April 20, 1950, Serial No. 157,158

6 Claims. (Cl. 23—259.2)

This invention relates to the production of superphosphate and has particular reference to an apparatus for continuously producing and curing the same.

The general well-known method for producing superphosphates is to mix ground phosphate-bearing mineral with sulfuric acid. The acidulated mineral is then placed in a den and allowed to cure. If the process is carried out in batches, the den is filled in successive charges and allowed to stand for a period of time. It is obvious that during this period of curing, the batch last added will be insufficiently cured during the time necessary to cure the first portion. Conversely, if sufficient time is allowed for the last batch to cure, then the first batch is likely to set up in a hard mass which is extremely difficult to handle. In either event, by the use of a noncontinuous den, it is extremely difficult to produce a uniform product. Numerous processes and apparatuses have been proposed to avoid these difficulties. Obviously, an apparatus which will provide for a continuous process is to be preferred since a set of conditions designed to promote high efficiency can best be maintained in a continuous plan.

Among the several types of continuous dens in operation may be mentioned the one revealed in U. S. Patent No. 1,870,278 issued to Broadfield. It comprises three endless conveyers with one conveyer forming the bottom of the den, and two similar conveyers forming the sides. In operation, the granular acidulated phosphate mineral is continuously fed in a thickened liquid mass into the conveyer den. Only infrequently does the mass come in contact with the sides of the den. The conveyers, when actuated, provide surfaces moving horizontally in the same direction. The material is thus conveyed, while solidifying, to a cutter. This apparatus, in addition to being complex and difficult to maintain, requires a cutter or other means to comminute the material as it comes from the den. In addition, operation of the den must be carried out on a continuous basis since the chamber formed by the conveyers is not filled with acidulated material and is not in a vertical position. Likewise, the acid and phosphate mineral must be thoroughly mixed and substantially reacted before the mixture is placed in the den, since the den is of a relatively shallow depth and gives a poor acid reaction.

It is an object of the present invention to provide a substantially vertical den capable of producing a uniform porous superphosphate.

Another object of the invention is to provide a vertical den capable of producing superphosphate efficiently either in batches or continuously.

Still another object of the instant invention is an apparatus for producing porous superphosphate, said apparatus not requiring the use of a cutter. Other objects of the instant invention will become apparent on a clearer understanding of the instant apparatus as hereinafter described.

The den comprises a chamber having a plurality of sides. The side are so positioned that the perimeter of the discharge end is substantially larger than the perimeter of the oppositely positioned charging end. This is accomplished by slanting at least two sides toward the vertical center of the den. Since the only purpose for so positioning the sides is to allow for expansion of the acid-phosphate mineral mixture as it sets into a semisolid or solid mass, it is not intended to limit the shape of the chamber, the retention time of the acid-phosphate mineral mixture in the den, or the conditions of acidulation, to specific figures. The only requirement is, as previously stated, that the discharge end of the chamber be enlarged sufficiently to allow for expansion of the material. Endless belts are placed in a vertical position and in proximate relation to the interior surface of at least one pair of opposing sides. While it is preferred to employ a four sided chamber with endless belts in proximate relation to one pair of opposing sides, the instant invention operates equally well if one pair of opposing sides merely consists of the endless belts previously referred to. A three sided chamber can also be used. In either case, however, it is necessary that the sides be positioned so that there is room for expansion of the acidulating material at the bottom of the den. It is likewise preferred that the surfaces of said belts be uneven, or have affixed to them means for roughening their surfaces.

This prevents the entire charge in the den from suddenly dropping to the bottom. Thus, as the belt is actuated the roughened surface permits only a small part of the total charge to drop from the den each minute.

For a clearer understanding of the instant invention and its operation, reference may be had to Figure 1 which is a sectional elevation of the vertical den, to Figure 2 which is a plan view of the den, and to the detailed description which follows.

In the preferred embodiment of the invention, as shown in Figure 1, the sides 1 and 2 of the den have endless belts 5 and 6 positioned in proximate relation to the interior surfaces of said sides and so arranged that the discharging end 3 is substantially larger in perimeter than the charging end 4. In Figure 2, the top view shows one pair of opposing sides 13 and 14 which do not have endless belts positioned in proximate relation to their interior surfaces. This is the preferred arrangement; however, the invention operates equally well if these sides are equipped with belts in the same manner as the sides 1 and 2.

The pyramidal effect achieved is somewhat exaggerated in Figure 1 for purposes of illustration. It is not necessary that all sides of the chamber slope towards the center, although it is preferred that such be done. In this regard, it has been found that if each of at least one pair of opposing sides of between about 14 and 18 feet in height slopes towards the center of the chamber so that each sloping side is between about 12 and about 30 inches away from a vertical position, the lower portion of the den is sufficiently enlarged to permit expansion of the acid-phosphate mixture. It is preferred to position all sides so that they slope equally towards the center of the chamber, so that if the height of the chamber is about 16 feet, the sides will slope away from the vertical position about 24 inches at the top as shown in Figure 1. The endless belts 5 and 6 are positioned on rollers 7, 8, 9 and 10 in proximate relation to the interior surfaces of the sides 1 and 2. It is preferred to so position the aforesaid rollers that the surface of the belt nearest the interior surface of the side travels, when actuated, substantially parallel to said side.

The apparatus operates more efficiently if cleats 11 are affixed to the surface of said endless belt. These cleats may be comprised of wood, rubber, or some other relatively acid-impervious material. As shown in Figure 2, the cleats 11 are preferably equal in length to the width of the endless belts 5 and 6.

Rollers 9 and 10 are mounted on shafts 15 and 16, respectively. Rollers 7 and 8 are mounted on shafts 7a and 8a, respectively. Shafts 7a and 8a extend beyond rollers 7 and 8 and through apertures 7b and 8b in wall 14. On the extended ends of shafts 7 and 8 are mounted meshing gears 17 and 18, respectively. Gear 18 is driven by a pinion gear 19 and through this system of gear 17, 18 and 19 belts 5 and 6 are moved simultaneously. Pinion gear 19 is driven by suitable means such as an electric motor 20.

Below the den is positioned a belt conveyer 21 driven from sheave 22. Conveyer 21 removes the material, breaking off when unsupported, to a storage bin not shown.

In the operation of the instant invention, a removable panel, or some other means of closure not shown is employed to close the charging end 4. With the charging end closed, the endless belts are actuated by motor 20 and the panel allowed to travel downward from the charging end about 2 feet. At this point an acid-phosphate rock mixture is continuously added to the den through the charging end 4. The speed of the belt and the rate of adding the acid-rock mixture are adjusted so that the top level of the mixture in the den remains substantially constant. When the mixture has reached the bottom of the den it has hardened sufficiently and the panel is removed. Continuous operation is thus started and as long as material is added at the top a hardened material will discharge from the bottom. By proper adjustment of the speed of the rollers and proper control of the composition of the mixture as well as the speed at which it is added to the den, a continuous process for curing superphosphate is made available.

The following examples are given merely to illustrate the preferred conditions for operation and to show the type of product produced, and are not to be considered a limitation of the instant novel apparatus.

*Example I*

A vertical den of the preferred type previously described was placed in operation as follows. A closure was placed on the cleats at the input side of the vertical den. The belt was then actuated by means of a motor driven gear arrangement such that the belt would make about one complete revolution in eight hours. 2.7 pounds of phosphate rock of 50% —200 mesh size, and having a BPL (bone phosphate of lime) content of 72.89%, were acidulated with 2.22 pounds of 73% sulfuric acid per minute. This procedure was continuously followed for four hours, at which time the den had been filled. This material was permitted to remain in the den for eighteen hours, at which time it was sampled for analysis. The result of this analysis was as follows:

| | Per cent |
|---|---|
| Total $P_2O_5$ | 20.7 |
| Water soluble $P_2O_5$ | 13.5 |
| Available $P_2O_5$ | 14.9 |

*Example II*

In a run in which conditions were similar to those in Example I, the acidulated material was sampled as it discharged from the vertical den after a four hour retention time. The result of this analysis was as follows:

| | Per cent |
|---|---|
| Total $P_2O_5$ | 19.80 |
| Water soluble $P_2O_5$ | 13.05 |
| Available $P_2O_5$ | 13.05 |

Having thus fully described and illustrated the character of the invention, what is desired to be secured and claimed by Letters Patent is:

1. A den for continuous solidifying of superphosphate slurry comprising a multisided unit having one pair of oppositely positioned stationary walls and one pair of oppositely positioned moving walls, at least one pair of said walls being progressively divergent from top to bottom, the moving walls being endless belts movable synchronously in a downward direction, the interior of one type of wall being in contact with the extremities of the other type of wall to form the lateral substantially fluid tight sides of an enclosure at the inlet end of said unit, the bottom side of said enclosure being closed by superphosphate which has set during passage downward between the walls, and means for actuating said endless belts.

2. An apparatus according to claim 1 wherein means are secured to the surfaces of said belts to render them substantially uneven.

3. An apparatus according to claim 1 wherein cleats are affixed to the surfaces of said belts at regular intervals, said cleats being substantially parallel to each other, thereby providing roughened surfaces moving in a substantially vertical direction.

4. A substantially symmetrical den for continuous solidifying of superphosphate comprising a unit of at least four sides having at least one pair of opposed fixed sides vertically positioned and at least one other pair of opposed moving sides, the latter being endless belts sloped toward the vertical center of said chamber so that the perimeter of the top of said den is substantially smaller than the bottom of said den, the interior surfaces of the fixed sides being in contact with the extremities of the moving sides to form the lateral substantially fluid tight sides of an enclosure at the inlet end of said den, the bottom side of said enclosure being closed by superphosphate which has previously solidified during operation, and means for actuating said endless belts to provide surfaces moving in a downward direction.

5. A den comprising a four-sided unit having two fixed opposed walls and two moving opposed walls, the interior surfaces of the fixed walls being in contact with the extremities of the moving walls to form the lateral substantially fluid tight sides of an enclosure at the inlet end of said unit, the bottom side of said enclosure being closed by superphosphate which has solidified during operation, said moving walls being endless belts positioned progressively divergent from top to bottom, the surfaces of which belts are provided with cleats affixed in substantially horizontal position, said belts being capable of downward movement, means for actuating said belts to provide for surfaces moving in a downward direction, and means positioned at the bottom of said unit for the removal of material solidified during passage therethrough.

6. In a den for continuous solidifying of superphosphate having interior surfaces capable of movement, the combination consisting of a chamber having four sides, two opposing sides being fixed walls and two opposing endless belts constituting movable walls for the remaining sides, the interior surfaces of the fixed walls being in contact with the extremities of the moving walls to form the lateral substantially fluid tight sides of an enclosure at the inlet end of said unit, the bottom side of said enclosure being closed by superphosphate which has solidified during operation, said endless belts being progressively divergent from top to bottom, appendage means for rendering the surface of the belts uneven, and means for actuating said belts to provide downward movement of the belts.

References Cited in the file of this patent

UNITED STATES PATENTS

| 594,583 | Wood | Nov. 30, 1897 |
| 621,237 | Fisher | Mar. 14, 1899 |
| 1,503,479 | Coats | Aug. 5, 1924 |
| 1,633,236 | Troil | June 21, 1927 |
| 2,187,101 | Schneider | Jan. 16, 1940 |
| 2,194,593 | Graham | Mar. 26, 1940 |
| 2,466,612 | Phillips et al. | Apr. 5, 1949 |
| 2,575,092 | Bouvier et al. | Nov. 13, 1951 |

FOREIGN PATENTS

| 468,543 | Germany | Nov. 14, 1928 |
| 341,023 | Great Britain | Jan. 5, 1931 |